United States Patent [19]

Laroche et al.

[11] 4,198,254
[45] Apr. 15, 1980

[54] VITREOUS SHEETS WITH SYNTHETIC POLYMER SPACER AND PROCESS FOR MAKING THE SAME

[75] Inventors: Pierre Laroche, Nalinnes; Jean Rase, Ransart, both of Belgium

[73] Assignee: BFG Glassgroup, Paris, France

[21] Appl. No.: 854,535

[22] Filed: Nov. 25, 1977

[30] Foreign Application Priority Data

Nov. 26, 1976 [GB] United Kingdom ............... 49416/76

[51] Int. Cl.² ............................................... B32B 17/00
[52] U.S. Cl. .................................... 156/107; 156/109; 156/292; 428/34; 52/172
[58] Field of Search ...................... 156/107, 109, 292; 52/616, 172; 55/385; 428/34

[56] References Cited

U.S. PATENT DOCUMENTS

| | | | |
|---|---|---|---|
| 2,257,680 | 9/1941 | Haux | 428/34 |
| 3,630,814 | 12/1971 | Arnold | 428/34 |
| 3,758,996 | 9/1973 | Bowser | 55/385 R |
| 3,897,580 | 7/1975 | Ingemansson | 428/34 |
| 3,991,910 | 2/1974 | Bowser | 156/109 |

*Primary Examiner*—George F. Lesmes
*Assistant Examiner*—E. Rollins Buffalow
*Attorney, Agent, or Firm*—Cushman, Darby and Cushman

[57] ABSTRACT

A hollow panel is prepared by uniting vitreous sheets by a spacer of synthetic polymeric material between the sheets. Preferably the polymeric material is a mixture including two polymers of substantially different molecular weight. A ribbon made of the polymeric composition is also disclosed.

20 Claims, 4 Drawing Figures

VITREOUS SHEETS WITH SYNTHETIC POLYMER SPACER AND PROCESS FOR MAKING THE SAME

This invention relates to a method of manufacturing a hollow panel by uniting vitreous sheets by means of a spacer of synthetic polymeric material located between and adherent to margins of such sheets. The invention also relates to spacer materials for such panels.

Prior art methods in the category referred to (see, for example, U.S. Pat. Nos. 3,758,996 and 3,791,910) are capable of use in the mass production of hollow glazing units but there is need for improvements in certain respects. It is often important to achieve a predetermined spacing of the vitreous sheets in the finished panel in a reproducible manner. This has proved to be difficult by some of the known methods due to characteristics of the prefabricated spacer strips, including minor variations in their cross-sectional dimensions, and/or to problems associated with the assembly and jointing of the sheets and spacer strips. Another disadvantage, attributable to various of the known methods, is that the panels do not satisfy one or more quality specifications which panel manufacturers are now frequently asked to observe and which relate specifically to properties of the spacer itself. The forces to which the spacers are subjected in course of use due to their manner of installation or environmental conditions require spacers to have a certain inherent strength but at the same time a certain elasticity. Panels made by known methods have developed various faults which are attributable to the inter-sheet joints. Some of these faults are clearly due to inadequate mechanical properties of the spacers but others have proved to be more difficult to explain.

An object of the present invention is to provide a method by which vitreous sheets can be joined at a predetermined spacing, within very close tolerances. Another object is to provide such a method which is suitable for use under industrial conditions in the mass production manufacture of hollow panels with high quality hermetically sealed joints between the panel sheets such as may be required, for example, in hollow glazing units for installation in the exterior walls of buildings.

According to the present invention, there is provided an improvement in a method of manufacturing a hollow panel by uniting vitreous sheets by means of a spacer of synthetic polymeric material located between and adherent to margins of such sheets, which improvement comprises the steps of laying upon the margin of one of the sheets a hardenable viscoelastic ribbon having cross-sectional dimensions and a viscosity sufficient to maintain the two sheets at at least the required final inter-sheet spacing under the weight of the superimposed sheet when the sheets are disposed horizontally with the ribbon between them, laying the other sheet in generally horizontal position supported by said ribbon, and then subjecting said ribbon to hardening conditions while the sheets are at said final required spacing to convert the ribbon into a spacer having a tensile strength of at least 4 kg/cm$^2$, an elongation at break in excess of 50% and a water permeability of the polymeric material less than 0.2 g of water per m$^2$ of surface per 24 hours per mm of material thickness per cm of Hg pressure.

This improved method can be economically applied on an industrial scale with reproducible results. One very important factor leading to this advantage is the formation of the spacer in situ from a ribbon which is able to support the superimposed vitreous sheet. It is not necessary to employ any extraneous temporary means for maintaining the vitreous sheets at the required final spacing while the ribbon undergoes conversion to a spacer strip with the specified properties. The assembly of the panel components is very simple. The thickness of the ribbon (i.e. that dimension thereof which is measured normally to the vitreous sheet on which the ribbon is initially laid) is not critical in the sense that the thickness of a finished prefabricated spacer strip would be critical. The ribbon thickness can exceed the required spacing between the vitreous sheets in the finished panel because the ribbon can be easily permanently deformed to make its thickness equal to the required inter-sheet spacing before the strip is hardened.

Furthermore the method according to the invention yields panels with inter-sheet joints having a combination of properties which has been found to be important for good performance, which properties include a high degree of water-impermeability of the sheet spacer. This factor contributes considerably to reducing deterioration of the inter-sheet joints during prolonged use of the panel.

The viscoelastic ribbon may be a continuous length of the viscoelastic material which is laid along the entire peripheral margin of the one vitreous sheet. As an alternative the ribbon may comprise two or more separate lengths of such material which are laid along different margins of such sheet and which may be caused or allowed to become joined or bonded together end to end during or after that operation. The terms "ribbon" and "spacer" where used in the above definition of the invention are to be construed accordingly, that is, to include not only a single piece ribbon and a single piece spacer respectively but also a ribbon and a spacer composed of separately fabricated lengths of material.

The term "hardening" where used in the above definition of the invention in relation to the viscoelastic ribbon is used as a compendious term to denote an increase in viscosity and strength due to change in chemical composition of the ribbon and the cognate term "hardenable" is to be construed accordingly. The chemical change may, for example, involve vulcanization or chemical cross-linking.

In a preferred method according to the invention the viscoelastic ribbon is extruded onto the margin of the one vitreous sheet. It is very convenient to carry out the invention in this way. Storage of viscoelastic ribbon awaiting use is obviated and the ribbon is applied in fresh condition. The strip material can be extruded in a factory in which the seals or joints are formed and the quality of the extruded product can easily be checked and adjusted at any time. The ribbon can be laid progressively along the margin of the vitreous sheet by extruding the ribbon onto that sheet while the extruder and the sheet are relatively displaced.

As an alternative procedure the ribbon can be derived from a temporary storage facility. For example, the extruded ribbon can be coiled preparatory to withdrawal from the coil to an assembly station. An anti-adhesive material, for example, a material in powder form, may be applied to the extruded ribbon to prevent too firm adhesion between the convolutions.

In preferred methods according to the invention the thickness of the ribbon (measured in a direction normal to vitreous sheets between which it is located preparatory to the hardening operation) is in excess of the required final inter-sheet spacing and pressure is exerted on the assembly to bring the sheets to that required value before the ribbon is converted into the spacer. Preferably, this is accomplished while the assembly is on a horizontal support, by means of one or more rollers spaced above that support by a distance equal to the required final inter-sheet spacing, the support and roller being relatively displaced to cause the roller to bear against the upper vitreous sheet.

The viscoelastic ribbon is preferably formed of a composition having at 80° C. an estimated viscosity of 40,000 to 120,000 poises estimated by means of a Brabender plastograph wherein a bladed rotor is rotated at 10 revolutions per minute in a quantity of the composition at 80° C. held in a container. The resistance to rotation of the rotor is compared with the resistance to rotation in a reference material and the result is used as a basis for the estimated viscosity of the sample. As stated above, the estimated range of 40,000 to 120,000 is not critical. Compositions outside that range can be used, e.g. compositions having an estimated viscosity up to 250,000 poises.

The viscoelastic ribbon must be capable of resisting significant deformation under the forces imposed by the superencumbent vitreous sheet and of resisting any permanent deformation under any forces which may be imposed by the handling of the ribbon, for example, coiling and uncoiling as hereinbefore referred to, before it is laid on one of the vitreous sheets in the panel assembly operation.

Preferably the viscoelastic ribbon has a tensile strength of from 0.5 to 3 kg/cm$^2$. These values for the tensile strength of the viscoelastic ribbon and the values hereinafter given relating to the tensile strength of the spacer formed from the viscoelastic ribbon are obtained according to French Standard NF. 46.002 using an H3 type gauge and a traction rate of 50 cm/minute.

In preferred embodiments of the invention the viscoelastic ribbon has an elongation at break in excess of 700%. In certain embodiments of the invention the composition of the viscoelastic ribbon and the hardening conditions to which it is subjected are such that the spacer has a tensile strength of from 4 to 50 kg/cm$^2$. These values are not critical. For example, the spacer may have a somewhat higher tensile strength. Generally speaking the best panels incorporate a spacer having a tensile strength of at least 10 kg/cm$^2$, the optimum range being 12 to 16 kg/cm$^2$. Advantageously, the composition of the viscoelastic ribbon and the hardening conditions are such that the spacer has an elongation at break exceeding 100%, for example, between 150 and 500%, the optimum range being 150 to 450%.

Synthetic polymers of various types can be used as a basis for the viscoelastic ribbon composition. There can be cited, for example, synthetic elastomers which can acquire a stable structure with the required physical properties simply by cooling. We refer here particularly to the class of materials called "thermoplastic rubbers". Preferred categories of synthetic polymeric materials for forming the viscoelastic ribbon comprise curable elastomeric materials and particularly those which by appropriate selection of curing or vulcanizing agents can be cured at relatively low temperatures, say less than 100° C. Deserving of particular mention are compositions based on one or more butyl rubbers alone or in combination with other polymers such as ethylene/vinyl acetate copolymers or polyisobutylene, compositions based on one or more ethylene/propylene terpolymers particularly terpolymers of ethylene and propylene with a nonconjugated diene (e.g. dicyclopentadiene, hexadiene or a bornene such as 2-ethyl norbornene) such as compositions based on a combination of an ethylene/propylene terpolymer and polyisobutylene, and compositions based on depolymerized butyl rubber, e.g. on a combination of such a polymer with an ethylene/vinylacetate copolymer with or without the addition of some other elastomer.

The foregoing is a summary of the most preferred elastomeric compositions but it is, of course, within the scope of the invention to use a viscoelastic ribbon composition of another type. As other examples reference is made to extrudable compositions based on a butadiene-styrene copolymer or a butadiene/acrylonitrile copolymer, natural rubber, polyisoprene and to compositions based on chlorosulphonated polyethylene (e.g. a chlorosulphonated polyethylene as marketed under the Trade Mark "Hypalon" by DuPont de Nemours), or on reaction products of aliphatic dihalide compounds, e.g. dichlorodiethyl formal, with metal polysulphides, e.g. sodium polysulfide, polysulphide rubbers, Thiokol rubbers.

Curable viscoelastic ribbon compositions will include an appropriate cross-linking or vulcanization agent. Vulcanizing agents suitable for compositions based on butyl rubber and ethylene/propylene terpolymers include para quinone dioxime in the presence of an oxidizer. Various halomethyl phenol formaldehyde resins can be used for curing unsaturated elastomers, e.g. butyl rubber, at elevated temperatures or even at room temperature (ref. "Ambient Curing of Unsaturated Elastomers with Halomethyl Phenolic Resins" by Kenneth C. Peterson: Paper presented to the Division of Rubber Chemistry, American Chemical Society, April 1971). Peroxides are suitable for cross-linking ethylene/propylene terpolymers and agents for cross-linking such polymers at room temperature and based on hydroperoxides are described in a paper by L. Corbelli and S. Giovanardi entitled "Crosslinking of Ethylene-Propylene Terpolymers at Room Temperature" published in the report of the Montedison Petrochemical Division Research Centre (1975).

Preferably the viscoelastic ribbon is capable of being and is, in fact, cured at less than 100° C. to form the spacer in situ. The selection of the viscoelastic composition so that curing can take place without the necessity for the ribbon to be heated to high temperatures of 100° C. or more is of practical advantage for reducing manufacturing costs. The manufacture of the panels is particularly facilitated if curing can take place at ambient temperature or with only moderate heating.

If heating of the viscoelastic ribbon is required to bring about its conversion to a spacer with the required properties, this can be achieved by placing the panel assembly in an oven. Alternatively heating can be confined to the region of the assembly where the spacer is located. Localized heating can, for example, be effected by a high-frequency heating technique provided that a polar compound, e.g. neoprene, is included in the ribbon composition or the composition includes a sufficiently high proportion of a suitable filler, e.g. carbon black, or titanium oxide, zinc oxide or barium oxide.

In carrying out a method according to the invention it is often advantageous to pre-heat at least the margins of the vitreous sheets before applying the viscoelastic ribbon.

Preferably the viscoelastic ribbon incorporates a mixture of high and low molecular weight polymeric substances. The use of polymers of substantially different molecular weights in the formation of the ribbon composition is recommended because adjustment of the relative proportions of such substances affects the viscoelastic properties and by appropriate selection of these proportions the viscoelastic ribbon can be given a favorable combination of properties enabling it to be conveniently laid, to support the superimposed vitreous sheet and to form after conversion a spacer with excellent mechanical properties which provide a stable and strong inter-sheet joint with adequate flexibility to withstand rupture due to flexure of the vitreous sheets, for example, due to thermal gradients across the panel or, in the case of exterior glazing units, to wind forces.

It is advantageous to employ a ribbon composition wherein there is at least one high molecular weight curable polymeric material diluted with at least one low molecular weight polymeric material and wherein the weight ratio of the low molecular weight polymeric material to the high molecular weight polymeric material is between 0.5:1 and 1.6:1. According to another advantageous embodiment use is made of a ribbon composition comprising at least one low molecular weight curable polymeric material diluted with at least one high molecular weight polymeric material and in which the weight ratio of the low molecular weight polymeric material to the high molecular weight polymeric material is higher than 2.5:1 e.g. between 2.5:1 and 3.5:1.

By way of example, the viscoelastic ribbon composition may comprise a low molecular weight butyl rubber (m.w. between 5000 and 50,000), e.g. Butyl LM and a high molecular weight butyl rubber (m.w. 400,000 to 600,000), e.g. Butyl B268, or a butyl rubber and a polyisobutylene of substantially higher or lower molecular weight than the butyl rubber.

The invention includes methods wherein the composition of the viscoelastic ribbon is based on one or more synthetic elastomers and is capable of being and is, in fact, applied in heated condition and converted to form said spacer by cooling in situ, e.g. compositions based mainly on a thermoplastic rubber as previously referred to.

The viscoelastic composition preferably includes a tackifier for promoting bonding of the spacer to the vitreous sheets.

In some embodiments the viscoelastic composition incorporates a hot melt adhesive. Such substances can also promote bonding to the vitreous sheets. Ethylene/-vinyl acetate copolymers which have been referred to as useful polymer bases for the viscoelastic composition also fall in the category of hot melt adhesives, as do terpene resins.

Various other types of ingredients can be incorporated in the viscoelastic ribbon, e.g. a filler for improving mechanical strength, a vulcanization inhibitor or retarder, a drying agent, a substance such as carbon black to function as an ultraviolet radiation screen, and a plasticizer.

For achieving a very durable bond between the spacer and the vitreous sheets it is recommended to apply a primer coating to the vitreous sheets where the spacer is to be located. A silane coating is particularly suitable for that purpose.

In some methods according to the invention at least one desiccant-containing strip is laid adjacent to the viscoelastic ribbon so that the desiccant-containing strip is located internally of the panel. The incorporation of the desiccant-containing strip improves the performance of the panel, assuming of course that it is one which is hermetically sealed. Advantageously there is at least one desiccant-containing strip which comprises a desiccant distributed in a water-permeable binder. The desiccant increases the resistance of the sealed panel to deteriorations in optical properties or structure by the effects of moisture. By incorporating the desiccant into a strip the incorporation of the desiccant into the panel is facilitated and a very favorable distribution of the desiccant can be insured. The desiccant binder can be based on one or more synthetic elastomers, preferably one or more butyl rubbers, an ethylene/vinyl acetate copolymer or polyvinyl chloride, to mention a few examples. The binder may furthermore incorporate a hot melt adhesive, e.g. an ethylene/vinyl acetate copolymer or some other ingredient serving as a tackifier to assist adhesion of the desiccant-containing strip to the viscoelastic spacer ribbon if that adhesion is required.

Advantageously the desiccant-containing strip or strips and the viscoelastic ribbon are caused to adhere to each other as or before the ribbon is laid on one of the vitreous sheets during the panel assembly operation. In some embodiments the desiccant-containing strip is an extruded strip. The viscoelastic spacer ribbon and the desiccant-containing strip can be co-extruded and caused to adhere as the ribbon is fed to or laid upon the vitreous sheet.

As an alternative or in addition to incorporating a separate desiccant-containing strip in the panel, a desiccant can be incorporated in the viscoelastic ribbon which is to form the spacer. Of course desiccant can be incorporated in the panel in some other way. For example, an air-pervious envelope filled with desiccant can be installed in the panel during assembly.

According to a second aspect of the present invention there is provided a viscoelastic ribbon adapted to be laid between margins of vitreous sheets and converted to form a sheet spacer, characterized in that the composition of said ribbon comprises a mixture of polymeric substances of different molecular weights, (e.g. such as mentioned above), has a viscosity at 80° C. of 40,000 to 120,000 poises, a tensile strength of at least 0.5 kg/cm$^2$ and an elongation at break in excess of 700%, and is curable by heating below 100° C. to form a spacer strip having a tensile strength of at least 4 kg/cm$^2$, an elongation at break in excess of 50% and a water permeability of the polymeric material of less than 0.2 g of water per m$^2$ of surface per 24 hours per mm of material thickness per cm of Hg pressure.

Such ribbons, which are very useful in the manufacture of hollow panels as hereinbefore appears, are new products in their own right.

Preferred features for ribbons according to the invention, including preferred tensile strength and elongation at break values have been disclosed above in connection with the performance of a panel manufacturing method according to the invention.

With respect to the polymeric material forming the basis of the viscoelastic ribbon we refer in particular to ribbon compositions comprising at least one high molecular weight curable polymeric material diluted with at least one low molecular weight polymeric material and wherein the weight ratio of the low molecular weight polymeric material to the high molecular weight polymeric material is between 0.5:1 and 1.6:1; also to ribbon compositions comprising at least one low molecular weight curable polymeric material diluted with at least one high molecular weight polymeric material and in which the weight ratio of the low molecular weight polymeric material to the high molecular weight polymeric material is higher than 2.5:1.

There are certain combinations of polymers which afford particularly good results. These include: (a) a butyl rubber in combination with an ethylene/vinyl acetate copolymer or a polyisobutylene which is of substantially higher or lower molecular weight than said butyl rubber, and in particular a butyl rubber with a molecular weight between 400,000 and 600,000 in combination with polyisobutylene having a molecular weight substantially below that range or a butyl rubber with a molecular weight between 5000 and 50,000 in combination with an ethylene/vinylacetate copolymer having a molecular weight substantially above that range; (b) an ethylene/propylene/diene terpolymer in combination with a polyisobutylene of substantially lower molecular weight than such terpolymer; (c) a depolymerized butyl rubber and an ethylene/vinyl acetate copolymer of substantially higher molecular weight than such polymer.

The foregoing types of polymer combinations are not exhaustive of what can be used but with suitable selection of the relative proportions of the different components of the combination, ribbons which are particularly efficacious for the purposes in view can be produced. The optimum proportions of such polymer components for any given composition will depend in part on the nature and proportion of the other ingredients of the composition and in particular on the nature and proportion of other polymeric material (if any) in that composition. Various examples of ribbon compositions, illustrating the above types of polymer combinations, are given below.

Ribbons according to the present invention can be used for forming inter-sheet spacers in the manufacture of hollow panels and/or for making water-tight seals between vitreous sheets and frames in which they are mounted.

Various features of the present invention are illustrated in the drawings.

In the following examples, Example 1 is an example of a panel manufacturing method according to the invention, Examples 2 to 9 are Examples of viscoelastic ribbons according to the invention and Example 10 is an example of a panel manufacturing method in which ribbons according to the invention are used for forming an inter-sheet spacer and for sealing the panel in a frame.

The following are the commercial sources of various substances used in those examples and the general nature of those substances which are identified by Trade Marks: "Butyl LM", "Butyl 268" and "Butyl LM 430": vulcanizable isoprene/isobutylene copolymers marketed by ESSO; "EVA" and "EVA 506B"; hot melt adhesives marketed by UNION CARBIDE; "Methylon" AP 108: phenolic resin tackifier marketed by GENERAL ELECTRIC; "Escorez" and "Escorez S 280": hydrocarbon resin tackifiers marketed by ESSO; "Caloxol W5 G": calcium oxide desiccant marketed by STURGE CHEMICALS; "Levilite": silica gel desiccant marketed by RHONE PROGIL; Molecular Sieve desiccant marketed by UNION CARBIDE; "Tonox": vulcanization inhibitor comprising p,p¹-diaminodiphenylmethane and m-aminoaniline marketed by UNIROYAL; GMF p-quinone dioxime vulcanizing agent marketed by UNIROYAL; OMYA EXH1: chalk diluent marketed by OMYA; "Noir P33": carbon black filler marketed by VANDERBILT; "Noir SOF": carbon black filler marketed by CABOT; $PbO_2$, $PbO_2HC6$, $MnO_2$: accelerators for GMF vulcanizing agent, marketed by RIEDEL DE HAEN; "Shellflex": plasticizers marketed by SHELL; "Dutral Ter 054/EM": vulcanizable ethylene/propylene/ethylidene norbornene terpolymer marketed by MONTEDISON; "Vistanex LMMS" and "VISTANEX 140": non-vulcanizable polyisobutylene marketed by ESSO; "Sunpar 2280": plasticizing oil marketed by SUN OIL COMPANY; "Protektor G3108": antioxidant wax sold by FULLER; "Anox HB": antioxidant marketed by BOZZETTO; "Indopol H300": non-vulcanizable polybutene marketed by AMOCO; Glycerol ester of rosin adhesive marketed by TENNECO; "Kalene 800" vulcanizable depolymerized butyl rubber marketed by HARDMAN.

EXAMPLE 1

Figure 1:
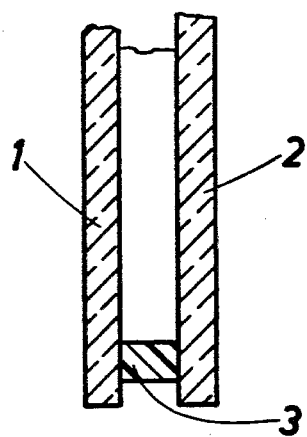
FIG. 1 is a side view showing the relationship between the spacer and the glass panes.

The glazing unit shown in FIG. 1 comprises two sheets of glass 1 and 2 secured in spaced relationship to a spacer 3 which hermetically encloses the space between the two sheets.

For the formation of the spacer an extrudable composition was prepared having the following ingredients:

|  | Parts by weight |
|---|---|
| Butyl LM (low molecular weight butyl polymer) | 100 |
| Butyl 268 (high molecular weight polymer) | 8 |
| EVA ethylene/vinyl acetate copolymer containing 28% vinyl acetate units and constituting a hot melt adhesive | 30 |
| "Methylon" AP 108 (phenolic resin tackifier) | 3 |
| "Escorez" (hydrocarbon resin tackifier) | 5 |
| "Caloxol W 5 G" (Calcium oxide drying agent) | 8 |
| "Levilite" (silica gel desiccant) | 20 |
| Molecular sieve desiccant ($KAlSiO_3$) | 5 |
| "Tonox" (vulcanization inhibitor) | 2 |
| GMF (p-quinone dioxime) vulcanizing agent | 3 |
| OMYA EXH1 chalk | 10 |
| Carbon black | 5 |
| $PbO_2$ (vulcanization accelerator) | 9 |
| "Shellflex" plasticizer | 4.5 |

Figure 2:
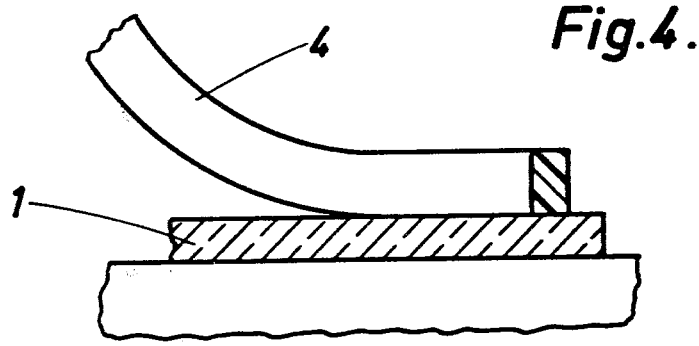
FIG. 2 is a side view showing the manner in which the viscoelastic ribbon is applied to a glass pane.
Figure 3:
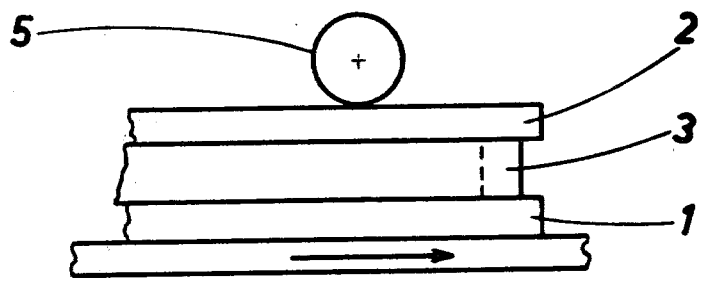
FIG. 3 is a side view showing the manner in which pressure may be applied to reduce the thickness of the ribbon.

The mutually soluble butyl polymers were mixed together at 130° C. and mixing was continued while all of the other ingredients, with the exception of the vulcanization accelerator, were added. The vulcanization accelerator was dispersed in the plasticizer and the resulting suspension was then mixed with the mixture of the other ingredients at 60° C. The resulting composition, which had an estimated viscosity at 80° C. of between 40,000 and 120,000 poises, was extruded at 60° C. to form an extruded ribbon having basically a rectangular cross-section with radiused corners measuring 10 mm×9 mm. This ribbon had a tensile strength of 1 kg/cm² and an elongation at break exceeding 800%. The ribbon was wound onto a core surfaced with silicone paper. After some days, a length of the extruded ribbon 4 was drawn from the coil and laid progressively along the margins of glass sheet 1 as represented in FIG. 2, which margins had been coated with amino-silane primer. The second glass sheet 2 which had been similarly marginally primed was then laid onto the applied viscoelastic ribbon. The ribbon supported the second glass sheet without undergoing any perceptible deformation under the supported weight. This assembly took place at room temperature. The assembly was then passed beneath a roller 5 (FIG. 3) located to exert downward pressure on the assembly to reduce the thickness of the ribbon (inter-sheet distance from 10 mm to 8 mm. The assembly was then placed in an oven for 2 hours at 80° C. This heat-treatment brought about the vulcanization of the ribbon to form the spacer 3. At the same time the ribbon became very firmly bonded to the glass sheets. Tests on similarly composed and treated ribbon material showed that the vulcanized ribbon had a tensile strength of 16 kg/cm$^2$, an elongation at break of 400% and a water permeability of the polymer of 0.02 g of water per m$^2$ of surface per 24 hours per mm of material thickness per cm of Hg pressure. During manufacture of the glazing unit the vulcanized ribbon was pierced and pressure equalization between the interior of the unit and the environment was brought about in accordance with known practice in hollow glazing unit manufacture. The pierced hole or holes can very easily be resealed by local heating of the ribbon or by plugging or patching.

In a modification of the foregoing method the extruded viscoelastic composition was formulated as above except that the "Levilite" and the molecular sieve desiccants were omitted and the amounts of carbon black and "OMYA EXH1" were increased by a corresponding aggregate amount. During the assembly of a glazing unit using this modified extruded composition, a quantity of desiccant was enclosed in the unit. This desiccant was dispersed in a water-permeable binder, e.g. a binder based on one or more synthetic elastomers, forming a strip which was disposed just inside the course along which the extruded ribbon 4 was laid.

EXAMPLE 2

An extrudable viscoelastic composition was prepared having the following composition in parts by weight:

| | |
|---|---|
| "Dutral Ter 054/EM" terpolymer (an ethylene/propylene/diene terpolymer | 100 |
| Vistanex LMMS (polyisobutylene of molecular weight (8,700-10,000) | 100 |
| Sunpar 2280 (plasticizing oil) | 54 |
| Protektor G3108 (anti-oxidant wax) | 3.5 |
| Methylon AP108 (phenolic resin tackifier) | 3 |
| Escorez S 280 (hydrocarbon resin tackifier) | 5 |
| Anox HB (anti-oxidant) | 2 |
| GMF (p-quinone dioxime) vulcanizing agent | 4 |
| OMYA EXH1 chalk | 20 |
| "Levilite" (silica gel desiccant) | 20 |
| Noir SOF (carbon black filler) | 15 |
| Molecular Sieve 4A (dehydrating agent controlling rate of vulcanization) | 1 |
| EVA 506 B (ethylene/vinyl acetate copolymer) | 15 |
| Indopol H300 (polybutene) | 20 |
| Glycerol ester of rosin (adhesive) | 5 |
| PbO$_2$ HC6 (vulcanization accelerator) | 6 |
| Shellflex 451 NC (plasticizer) | 2 |

The composition had at 80° C. a viscosity corresponding to a torque of 400 g.m. estimated by the Brabender Plastograph Type 50. The composition was extruded at 60° C. to form a ribbon of cross-sectional dimensions suitable for use as an inter-sheet spacer in a hollow glass panel.

A specimen piece of the ribbon was heated at 80° C. for 3 hours. This treatment vulcanized the ribbon. Th vulcanized ribbon was found to have a tensile strength of 6 kg/cm$^2$, an elongation at break in excess of 150% and a water permeability of 0.1 g water per m$^2$ of surface per 24 hours per mm of material thickness per cm of Hg pressure.

EXAMPLE 3

An extrudable viscoelastic composition was prepared as in Example 2 but with the following modifications: The 100 parts by weight of Dutral Ter 054/EM terpolymer was replaced by 100 parts by weight of Butyl 268 (butyl rubber with a molecular weight of 450,000 to 520,000); the amount of Sunpar 2280 plasticizing oil was reduced to 50 parts by weight; the EVA 506 B, Indopol H300 and glycerol ester of rosen adhesive were omitted.

This modified composition had at 80° C. a similar viscosity. The composition was extruded at 60° C. to form a ribbon for use as an inter-sheet spacer and the extruded ribbon was subjected to a vulcanizing treatment as performed in Example 1. The vulcanized ribbon had the following properties:
Tensile strength: 15 kg/cm$^2$
Elongation at break: above 100%
Water permeability: about 0.1 g/m$^2$ 24 hours/mm/cm of Hg

EXAMPLE 4

An extrudable viscoelastic composition was prepared having the following composition in parts by weight:

| | |
|---|---|
| Kalene 800 (depolymerized butyl rubber:) | 100 |
| EVA (ethylene/vinyl acetate copolymer containing 28% vinyl acetate units) | 30 |
| Vistanex 140 (polyisobutylene of molecular weight between 117,000 and 135,000) | 4 |
| Butyl B268 polymer (molecular weight: 450,000-520,000) | 4 |
| Protektor G3108 (anti-oxidant wax) | 3.5 |
| Escorez S 280 (hydrocarbon resin tackifier) | 5 |
| GMF (p-quinone dioxime) vulcanizing agent | 3 |
| OMYA EXH1 chalk | 20 |
| Noir SOF (carbon black filler) | 20 |
| "Levilite" (silica gel desiccant) | 20 |
| Molecular Sieve 4A (dehydrating agent controlling vulcanization rate) | 1 |
| Anox HB (anti-oxidant) | 2 |
| Methylon AP 108 (phenolic resin tackifier) | 3 |
| PbO$_2$ HC6 (vulcanization accelerator) | 6 |
| Shellflex 451 NC (plasticizer) | 2 |

This composition had a viscosity at 80° C. of the same order as the composition of Example 1. The composition was extruded and vulcanized by heating at 80° C. for three hours. The vulcanized ribbon had the following properties:
Tensile strength: 10 kg/cm$^2$
Elongation at break: 230%
Water permeability: about 0.1 g/cm$^2$/24 hours/mm/cm of Hg.

EXAMPLE 5

An extrudable viscoelastic composition was prepared having the following composition in parts by weight:

| | |
|---|---|
| Dutral Ter 054/EM | 100 |
| Vistanex LMMS | 100 |
| Sunpar 2280 | 54 |
| Protektor G3108 | 3.5 |
| Escorez S 280 | 5 |
| EVA 506 B | 15 |
| Glycerol ester of rosin | 5 |
| "Tonox" aromatic amine vulcanization retarder | 2 |
| GMF | 4 |
| OMYA EXH1 | 20 |
| Methylon AP 108 | 3 |
| Noir SOF | 10 |
| Noir P33 (thermal semi-reinforcing black filler) | 30 |
| Molecular Sieve 4A | 1 |
| Indopol H300 | 20 |
| MnO₂ (vulcanization accelerator) | 6 |
| Shellflex 451 NC | 6 |

The composition was extruded and vulcanized in the same way as the composition in Example 2 and the vulcanized ribbon has similar properties to the vulcanized ribbon in that Example.

EXAMPLE 6

An extrudable viscoelastic composition was prepared as in Example 5 except that 100 parts by weight of Butyl B268 were used in place of the 100 parts by weight of Dutral Ter 054/EM. The composition had at 80° C. a viscosity similar to that of the composition used in Example 3. The composition was extruded at 60° C. to form a ribbon and the ribbon was vulcanized by heating at 80° C. for 3 hours. The vulcanized ribbon had properties similar to those of the vulcanized ribbon in Example 3.

EXAMPLE 7

An extrudable viscoelastic composition was prepared as in Example 5 with, however, the following modifications: The composition contained 10 instead of 20 parts by weight of OMYA EXH1, 20 instead of 10 parts by weight of Noir SOF, and no Noir P33; the composition further included 20 parts by weight of Levilite and 2 parts by weight of Anox HB, and contained 6 parts by weight of PbO₂ HC6 instead of 6 parts by weight of MnO₂, and 2 parts instead of 6 parts by weight of Shellflex 451 NC.

The viscosity of the composition was of the same order as that of the composition in Examples 2 and 5. The composition was extruded to form a ribbon and the ribbon was vulcanized by heating at 80° C. for 3 hours. The vulcanized ribbon had properties similar to those of the vulcanized ribbon in Examples 2 and 5.

EXAMPLE 8

A viscoelastic composition was prepared having the following composition in parts by weight:

| | |
|---|---|
| Butyl B268 | 100 |
| Vistanex LMMS | 100 |
| Sunpar 2280 | 50 |
| Protektor G3108 | 3.5 |
| Escorez S 280 | 5 |
| Tonox | 2 |
| GMF | 4 |
| OMYA EXH1 | 20 |
| Noir SOF | 15 |
| Molecular Sieve 4A | 1 |
| Levilite | 20 |
| Methylon AP108 | 3 |
| Anox HB | 2 |
| PbO₂ HC6 | 6 |
| Shellflex 451 NC | 2 |

The composition had a viscosity of the same order as that of the composition in Example 3. The composition was extruded at 60° C. to form a ribbon. The ribbon was vulcanized by heating at 80° C. for 2 hours. The vulcanized ribbon had properties similar to those of the vulcanized ribbon in Example 3.

EXAMPLE 9

A viscoelastic composition was prepared having the following composition in parts by weight:

| | |
|---|---|
| Butyl LM 430 (butyl polymer with a molecular weight of 38,000-40,000) | 100 |
| EVA 506 B | 30 |
| Butyl B 268 | 8 |
| Protektor G 3108 | 3.5 |
| Escorez S 280 | 5 |
| Tonox | 2 |
| GMF | 3 |
| OMYA EXH1 | 20 |
| Noir SOF | 20 |
| Molecular Sieve 4A | 1 |
| Methylon AP 108 | 3 |
| MnO₂ | 7.5 |
| Shellflex 451 NC | 7.5 |

This composition had a viscosity similar to that of the composition in Example 1. The composition was extruded at 60° C. to form a ribbon. The ribbon was vulcanized by heating at 80° C. for a minimum of 2 hours. The vulcanized ribbon had the following properties:

Tensile strength: 10 kg/cm²
Elongation at break: well above 100%
Water permeability: 0.08 g/cm²/24 hours/mm/cm of Hg.

EXAMPLE 10

Figure 4:
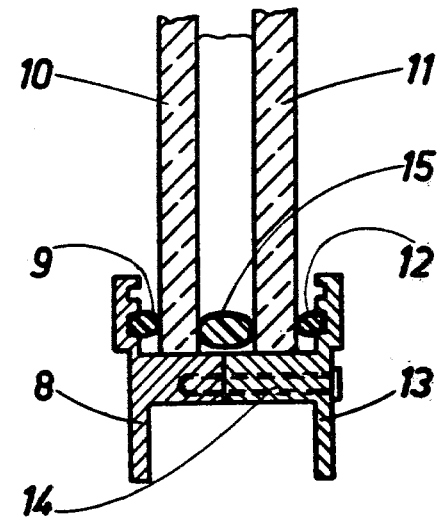
FIG. 4 is a side view showing a preferred assembly according to the present invention.

A hollow glazing unit as shown in FIG. 4 was manufactured as follows: A frame component 8 was primed by application of a primer coat to the face to be contacted by a sealing strip 9. The sealing strip 9, which was extruded from a composition as used in Example 1, was laid on the primed face of the frame component 8 and a marginally primed glass sheet 10 was placed in position to sandwich the strip 9 between that sheet and the frame component and subject the strip to sufficient pressure to deform it and insure firm contact of the glass sheet and the frame component 8 with the said strip. This sub-assembly was then heated for 2 hours at 80° C. to vulcanize the sealing strip and bring about its firm bonding to the glass sheet and the frame component. A second sub-assembly, comprising glass sheet 11, sealing strip 12 and frame component 13 was made in an identical manner. The two sub-assemblies were then connected together by bolts such as 14, screwed into threaded socke s in the frame components 8 and 13, after positioning a spacer ribbon 15 between the internal marginal faces of the two sheets of glass, which faces had been primed with an amino-silane primer. Ribbon 15 had been extruded from the same composition as that used for sealing strips 9 and 12. This ribbon 15 had a cross-section such that it became deformed and forced into firm contact with the glass sheets as the frame components became firmly bolted together. The complete assembly was then heated for 2 hours at 80° C. to bring about the vulcanization of strip 15 and its firm bonding to the glass.

Viscoelastic ribbons having a composition according to any of Examples 2 to 9 can be used in place of the viscoelastic ribbons 9, 12 and 15 in the above Example 10.

In a modification of the method according to Example 10, the sealing strips 9 and 12 were not vulcanized prior to connecting the sub-assemblies together. After such connection, a single vulcanization step was carried out to vulcanize the strips 9, 12 and the ribbon 15 simultaneously.

In a further modification of the said method, the spacer ribbon 15 was omitted and reliance was placed on the strips 9 and 12 and their firm bondage to the glass sheets and the frame components for air-tightly and moisture-tightly sealing the hollow unit.

In certain glazing units according to the invention, glass sheets were secured in spaced relationship by means of a cured spacer ribbon which was inset from the edges of the glass sheets and the groove between the projecting margins of the glass sheets was filled with a polyvinylidene chloride mastic to provide an additional moisture barrier and/or for any other required purpose.

The process can comprise, consist essentially of or consist of the steps set forth and the composition and product can comprise, consist essentially of or consist of the materials set forth.

What is claimed is:

1. In a method of manufacturing a hollow panel by uniting vitreous sheets by means of a spacer of synthetic polymeric material located between and adherent to margins of such sheets, the improvement consisting essentially of the steps of (1) laying upon the margin of one of the sheets a hardenable viscoelastic ribbon having cross-sectional dimensions and a viscosity sufficient to maintain the two sheets at at least the required final inter-sheet spacing under the weight of the superimposed sheet when the sheets are disposed horizontally with the ribbon between them, (2) laying the other sheet in generally horizontal position supported by said ribbon, and (3) then subjecting said ribbon to hardening conditions while the sheets are at said final required spacing to convert the ribbon into a spacer having a tensile strength of at least 4 kg/cm$^2$, an elongation at break in excess of 50% and a water permeability of the polymeric material less than 0.2 g of water per m$^2$ of surface per 24 hours per mm of material thickness per cm of Hg pressure, wherein said viscoelastic ribbon is cured in situ at less than 100° C. to form said spacer, and wherein prior to hardening, said viscoelastic ribbon is capable of resisting significant deformation under the forces imposed by the superencumbent vitreous sheet and of resisting any permanent deformation under any forces which may be imposed by the handling of the ribbon before it is laid on one of the vitreous sheets in the panel assembly operation.

2. A method as defined in claim 1 wherein said viscoelastic ribbon is laid by extruding the same onto the margin of said one sheet.

3. A method as defined in claim 1 wherein the thickness of the ribbon measured in a direction normal to the vitreous sheets between which it is located preparatory to the hardening operation is in excess of the said required final inter-sheet spacing and pressure is exerted on the assembly to bring the inter-sheet spacing to that required value before the ribbon is converted into said spacer.

4. A method as defined in claim 3 wherein said pressure is exerted by bringing about relative horizontal displacement between a support on which the assembly is located and at least one roller which is spaced above said support by a distance equal to the required final overall thickness of the panel, to cause said roller to bear against the upper vitreous sheet.

5. A method as defined in claim 1 wherein the composition forming said viscoelastic ribbon has at 80° C. a viscosity of between 40,000 to 120,000 poises estimated by means of a Brabender plastograph test as herein defined.

6. A method as defined in claim 5 wherein the viscoelastic ribbon has a tensile strength of from 0.5 to 3 kg/cm$^2$.

7. A method as defined in claim 6 wherein the viscoelastic ribbon has an elongation at break in excess of 700%.

8. A method as defined in claim 7 wherein the composition of said viscoelastic ribbon and said hardening conditions are such that the spacer has a tensile strength of from 4 to 50 kg/cm$^2$.

9. A method as defined in claim 8 wherein the composition of said viscoelastic ribbon and said hardening conditions are such that the spacer has a tensile strength of at least 10 kg/cm$^2$.

10. A method as defined in claim 9 wherein the composition of said viscoelastic ribbon and said hardening conditions are such that the spacer has an elongation at break exceeding 100%.

11. A method as defined in claim 10 wherein the composition of said viscoelastic ribbon and said hardening conditions are such that said spacer has an elongation at break of from 150 to 450%.

12. A method as defined in claim 1 wherein said viscoelastic ribbon incorporates a mixture of high and low molecular weight polymeric substances.

13. A method according to claim 12 wherein the high molecular weight polymeric substance is butyl rubber of molecular weight at least 400,000 and the low molecular weight polymeric substance is butyl rubber of molecular weight not over 50,000.

14. A method as defined in claim 1 wherein said viscoelastic ribbon incorporates a tackifier.

15. A method as defined in claim 1 wherein said viscoelastic ribbon incorporates a hot melt adhesive.

16. A method as defined in claim 1 wherein at least one desiccant-containing strip is laid adjacent to said ribbon so that the desiccant-containing strip is located internally of the panel.

17. A method as defined in claim 16 wherein at least one said desiccant-containing strip comprises a desiccant distributed in a water-permeable binder.

18. A method as defined in claim 16 wherein each desiccant-containing strip is caused to adhere to said ribbon.

19. A method as defined in claim 18 wherein said desiccant-containing strip and said ribbon are caused to adhere to each other as or before said ribbon is laid on said one vitreous sheet.

20. A method as defined in claim 16 wherein said desiccant-containing strip is an extruded strip.

* * * * *